Jan. 29, 1929.

E. J. WITCHGER 1,700,245

HOOK RULE

Filed May 25, 1927

INVENTOR
EUGENE J. WITCHGER
BY George B. Willcox.
ATTORNEY

Patented Jan. 29, 1929.

1,700,245

UNITED STATES PATENT OFFICE.

EUGENE J. WITCHGER, OF SAGINAW, MICHIGAN, ASSIGNOR TO LUFKIN RULE CO., OF SAGINAW, MICHIGAN, A CORPORATION OF MICHIGAN.

HOOK RULE.

Application filed May 25, 1927. Serial No. 194,054.

This invention relates to hook rules consisting of a double edged rule blade with graduations on both edges of both sides and a slotted or bifurcated head or clip receiving a projecting hook.

The improvement pertains more particularly to certain new and useful means for releasably clamping the hook on the end of the blade, and includes a hook clip that can be easily and quickly reversed to project over either edge of the blade as desired. This reversal can be made while the instrument is being held in the hand in the usual way, and without requiring a screw driver or other tool.

The new arrangement can be adapted to clamp hooks of the slidable type or to clamp hooks that turn end for end. The head or nut of the adjusting screw is partly concealed in the plane of the blade. In each instance, however, the same invention is found namely, a rule blade having a threaded screw, secured to and projecting from an end of the blade, in the plane of the blade, and fastening means co-operating with the screw so that the hook clip can be clamped to the blade and the hook can be reversed in direction, that is, made to project beyond either graduated edge of the rule without danger of the screw dropping out when loosened.

The clamping may be done by providing a rotatable screw and threading it into the clip, or by providing a non-rotatable screw and passing the screw through a hole in the clip and using a tightening nut on top. When a rotatable screw is used, shoulders are formed by slotting the blade and these shoulders may be engaged directly by the head of the clamp and screw, or a washer may be interposed between the shoulder and the screw head, without departing from the invention as defined in the claims.

With the foregoing and certain other objects in view, which will appear later in the specifications, my invention comprises the devices described and claimed and the equivalents thereof.

In the drawings Fig. 1 is a side view, showing the hook clip clamped in place.

Figure 1:
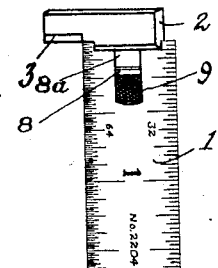

As clearly shown in the drawings, numeral 1 designates the usual rule blade and 2 is the hook-carrying clip.

In Fig. 1 the hook 3 is an integral projection of clip 2.

To produce the new and useful results above described, using a rotatable clamping screw, a slot 5 is formed in an end of the blade 1 and so shaped as to provide laterally projecting shoulders 6.

A threaded screw 7 is loosely received in the slot and in the plane of the blade and a washer 8 may be interposed on screw 7 against the head 9 of the screw. A non-rotatable retaining washer 8ª is preferably used to prevent the screw dropping out when loosened.

The clip 2 preferably has the lower part of its body bifurcated, as at 10, to straddle the end of blade 1 when clamped.

Figure 2:
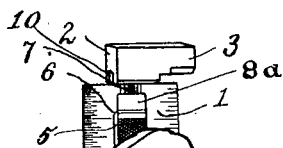
Fig. 2 is a side view, showing the manner of operating the screw to reverse the hook and clamp it.

In the form shown in Figs. 1 and 2 the bifurcated part of the clip 2 is drilled and threaded to receive the screw 7, so that by turning the head of the screw by the thumb, as shown in Fig. 2, or by the thumb and finger, the clip raises clear of the blade 1, and as shown in Figs. 1 and 2 can be reversed end for end.

Figure 3:
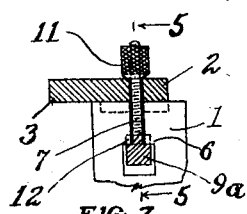
Fig. 3 is a part sectional view of a hook substantially of the kind illustrated in Fig. 1 but having a modified form of screw device for releasably clamping the hook clip to the blade.
Figure 4:
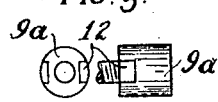
Fig. 4 is a detail of the screw head of Fig. 3.
Figure 5:
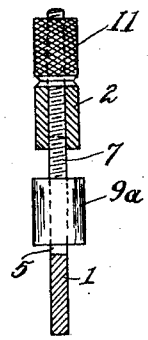
Fig. 5 is an enlarged sectional view on line 5—5 of Fig. 3.

In the form shown in Fig. 3 the screw 7 is non-rotatable. It passes through a hole in the clip 2 and is tightened by means of nut 11 on top of the clip. In this case the screw head 9ª is prevented from rotating in blade 1 by notches 12 that receive the shoulders 6, or by any equivalent device.

By the means above described I have produced a simple and very convenient reversible hook rule that can be adjusted without the use of a screw driver or other tool. It is but slightly thicker than an ordinary steel machinist's scale and is simple in construction and relatively inexpensive to manufacture.

Having thus described my invention, what I claim and desire to secure by Letters Patent is:

1. Means for releasably securing a hook-clip to a rule blade, comprising an end of said blade formed with a longitudinal slot shaped to provide a laterally projecting shoulder, and a headed screw received in said slot and disposed with its longituinal axis in the plane of the blade, a member on said screw engaged by said shoulder and itself engaging the side walls thereof to retain the screw in place when loosened, and means on said screw for releasably clamping said hook-clip to said blade, for the purposes set forth.

2. Means for releasably securing a hook clip to a rule blade, comprising an end of said rule formed with a longitudinal slot shaped to provide a laterally projecting shoulder, and a headed screw received in said slot and disposed with its longitudinal axis in the plane of the blade, a non-rotatable retaining washer on said screw between its head and said shoulder, said washer engaging the side walls of the blade, and means on said screw for releasably clamping said hook-clip to said blade, for the purposes set forth.

In testimony whereof, I affix my signature.

EUGENE J. WITCHGER.